H. BLAKE.
Improvement in Cream-Strainers.
No. 133,009. Patented Nov. 12, 1872.
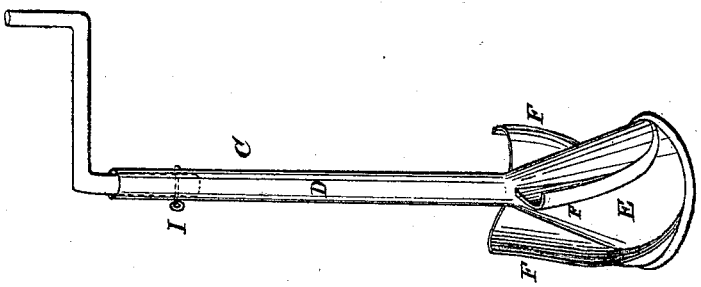
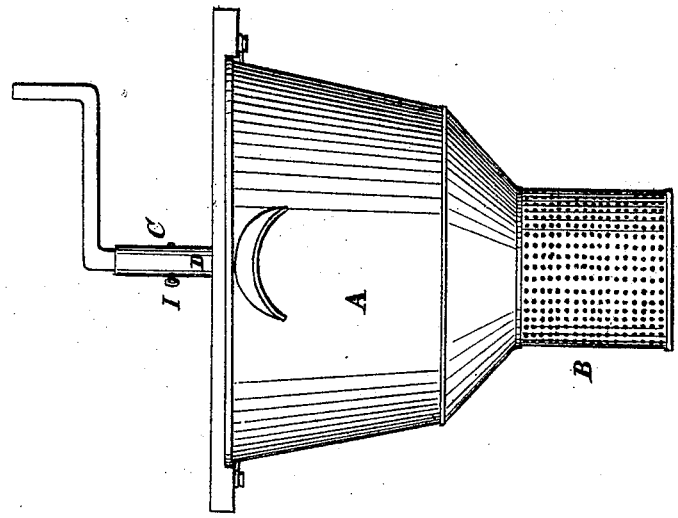
Witnesses:
Newton Crawford
H. A. Daniels
Harry Blake, Inventor:
C S Whitman Attorney.

UNITED STATES PATENT OFFICE.

HARRY BLAKE, OF PANAMA, NEW YORK.

IMPROVEMENT IN CREAM-STRAINERS.

Specification forming part of Letters Patent No. 133,009, dated November 12, 1872.

*To all whom it may concern:*

Be it known that I, HARRY BLAKE, of Panama, in the county of Chautauqua, in the State of New York, have invented an improvement on the patent granted to me on the 22d of November, 1870; and do hereby declare that the following description, taken in connection with the accompanying plate of drawing hereinafter referred to, forms a full and exact specification of the same, wherein I have set forth the nature of my said improvement by which my invention may be distinguished from others of a similar class, together with such parts as I claim and desire to secure by Letters Patent.

My invention relates to an implement made use of for the purpose of straining and mixing cream preparatory to churning; and the nature thereof consists in certain modifications in the details of the construction of the same, hereinafter described and shown.

In the accompanying plate of drawing, which illustrates my invention and forms a part of the specification thereof—

Figure 1 is a side elevation of the implement. Fig. 2 illustrates the construction of the crank-shaft.

The construction and operation of my invention may be described as follows: In the drawing, letter A represents the vessel into which the cream is poured, and the bottom of which is made convex, sloping down toward the center, where the perforated cup or strainer B is attached to it. The crank-shaft C consists of the hollow cylinder D, provided with a conical base, E, upon which are the warped surfaces or flanges F. The said conical base is hollow, and is to be filled with water, by means of the tube D, for the purpose of cooling the cream. The top of the tube D is closed by the crank H, which fits within the same, and is secured thereto by means of the pin I. By the rotation of the warped surfaces F the cream is forced rapidly through the strainer, with a uniform pressure against it in every direction.

Having thus described my invention, I claim and desire to secure by Letters Patent—

The hollow conical base E provided with the crank-shaft D and flanges F, when combined in operation with the perforated cylinder or strainer B, as described.

In witness whereof I have subscribed my name hereto the 7th day of February, 1872.

HARRY BLAKE.

Witnesses:
    THADDEUS F. RANDOLPH,
    F. G. STEWARD.